UNITED STATES PATENT OFFICE.

PAUL COMMENT, OF MULHOUSE, ALSACE, FRANCE, ASSIGNOR TO SOCIÉTÉ FABRIQUES DE PRODUITS CHIMIQUES DE THANN ET DE MULHOUSE, OF MULHOUSE, ALSACE, FRANCE.

MANUFACTURE OF POTASSIUM SULPHATE AND HYDROCHLORIC ACID.

1,417,887.     Specification of Letters Patent.     Patented May 30, 1922.

No Drawing.     Application filed November 4, 1920. Serial No. 421,778.

*To all whom it may concern:*

Be it known that I, PAUL COMMENT, a citizen of the Republic of Switzerland, and a resident of Mulhouse, Alsace, France, have invented new and useful Improvements in the Manufacture of Potassium Sulphate and Hydrochloric Acid, which invention is fully set forth in the following specification.

In my United States Letters-Patent granted September 6, 1921, No. 1,389,862, there is described a process for the manufacture of potassium sulphate which occurs in three stages, namely desiccation, heating at about 300° C. and heating at about 700° C.–800° C.; these three stages occur either in distinct apparatus or in a single muffle furnace comprising several compartments of sufficiently increasing temperature.

According to the present invention the three stages may occur in a furnace other than a muffle furnace, for instance in a single direct-flame furnace wherein the flame is sufficiently long to provide different zones of decreasing temperature; such furnace may be subdivided into compartments, if necessary, or the single furnace may be of compound type in which direct heating by flame and indirect muffle heating are both possible.

It is evident that the compound furnace may be used in different manners accordingly as it is desired to heat directly or indirectly (by the muffle), whichever of the three stages is under consideration.

Instead of operating in three stages as has been described in the aforesaid United States Letters Patent, it is possible to conduct the process in a sufficiently progressive manner in a single furnace so as to obtain first the desiccation, which should occur at a low temperature, that is to say between 120° and 300° C., and then to heat the material in the rest of the furnace to the necessary temperature, care being taken that in passing through the desiccating zone the mass travels sufficiently slowly to remain solid and porous.

In the aforesaid United States Letters Patent it is stated that there may be used for the manufacture of potassium sulphate a sulphuric acid containing about 70–72 per cent of $SO_3$. By the present invention a more concentrated aqueous sulphuric acid may be used, whereby the reaction proceeds better still; however, it is more advantageous from the point of view of economy to use acid as dilute as possible.

Having thus described the nature of the said invention and the best means I know of carrying the same into practical effect, I claim:—

1. A process for making potassium sulphate and hydrochloric acid, which process consists in mixing finely pulverized potassium chloride with sulphuric acid in such proportions that the moist mixture remains as pulverulent as possible, and heating the mixture in a direct-flame furnace, so that the mixture is first desiccated then heated at about 300° C. and finally heated at about 700° C.–800° C.

2. A process for making potassium sulphate and hydrochloric acid, which process consists in mixing finely pulverized potassium chloride with sulphuric acid in such proportions that the moist mixture remains as pulverulent as possible, and heating the mixture in a compound direct-flame and muffle furnace so that the mixture is first desiccated then heated at about 300° C. and finally heated at about 700° C.–800° C.

3. A process for making potassium sulphate and hydrochloric acid, which process consists in mixing finely pulverized potassium chloride with sulphuric acid in such proportions that the moist mixture remains as pulverulent as possible, and heating the mixture in a furnace wherein the temperature in the first zone increases progressively from 120°–300° C., and in the rest of furnace from 300° to 800° C., care being taken that during its travel through the furnace the mass moves sufficiently slowly to remain solid and porous.

4. A process for making potassium sulphate and hydrochloric acid, which process consists in mixing finely pulverized potassium chloride with sulphuric acid containing about 70–72 per cent of $SO_3$, in such proportions that the moist mixture remains as pulverulent as possible, and heating the mixture in a direct-flame furnace so that the mixture is first desiccated, then heated at about 300° C. and finally heated at about 700° C.–800° C.

In witness whereof I have hereunto signed my name.

PAUL COMMENT.